(12) United States Patent
Mahadevappa et al.

(10) Patent No.: US 7,738,575 B2
(45) Date of Patent: Jun. 15, 2010

(54) OVERLAP-AND-ADD WITH DC-OFFSET CORRECTION

(75) Inventors: Ravishankar H. Mahadevappa, Irvine, CA (US); Stephan ten Brink, Irvine, CA (US)

(73) Assignee: Realtek Semiconductor Corp., Hsinchu (TW)

( * ) Notice: Subject to any disclaimer, the term of this patent is extended or adjusted under 35 U.S.C. 154(b) by 818 days.

(21) Appl. No.: 11/490,850

(22) Filed: Jul. 21, 2006

(65) Prior Publication Data

US 2007/0058738 A1 Mar. 15, 2007

Related U.S. Application Data

(60) Provisional application No. 60/701,711, filed on Jul. 21, 2005.

(51) Int. Cl.
*H04K 1/10* (2006.01)
(52) U.S. Cl. ........................ 375/260; 375/316
(58) Field of Classification Search ................. 375/326, 375/260, 316; 370/208–210
See application file for complete search history.

(56) References Cited

U.S. PATENT DOCUMENTS

| 5,903,595 | A | | 5/1999 | Suzuki | |
|---|---|---|---|---|---|
| 5,930,231 | A | * | 7/1999 | Miller et al. | 370/210 |
| 6,539,065 | B1 | * | 3/2003 | Furukawa | 375/316 |
| 7,499,508 | B2 | * | 3/2009 | Sayeed | 375/345 |
| 2001/0025291 | A1 | * | 9/2001 | Leyonhjelm et al. | 708/420 |
| 2003/0058966 | A1 | * | 3/2003 | Gilbert et al. | 375/326 |
| 2003/0123383 | A1 | * | 7/2003 | Korobkov et al. | 370/208 |
| 2004/0013084 | A1 | * | 1/2004 | Thomas et al. | 370/210 |
| 2004/0179580 | A1 | | 9/2004 | Yamaguchi | |
| 2005/0111524 | A1 | | 5/2005 | Baker et al. | |
| 2005/0111525 | A1 | | 5/2005 | Driesen et al. | |
| 2005/0129153 | A1 | | 6/2005 | McCorkle | |

(Continued)

FOREIGN PATENT DOCUMENTS

| TW | 200400710 | 1/2004 |
|---|---|---|
| TW | 1221715 | 10/2004 |
| TW | 1225335 | 12/2004 |

OTHER PUBLICATIONS

International Search Report for International Application No. PCT/US2006/028467, International Application filed Jul. 21, 2006, Inventor: Ravishankar H. Mahadevappa, et al. International Search Report completed Jan. 5, 2007 and mailed Feb. 20, 2007 (2 pgs.).

(Continued)

*Primary Examiner*—Emmanuel Bayard
(74) *Attorney, Agent, or Firm*—Thomas, Kayden, Horstemeyer & Risley (57) ABSTRACT

A method and system for estimating DC offset and removing the excess DC offset from samples used by an overlap-and-add operation at the receiver of OFDM symbols in UWB communication. The DC offset for each sample within the overlap-and-add interval may be estimated using a sliding window, of the size required for an FFT, operation over past samples. The DC offset may be estimated for a sample within the overlap-and-add interval and updated for the succeeding samples. A size of the overlap-and-add interval may be fixed or may be allowed to vary according to switching characteristics of an analog RF stage preceding the overlap-and-add operation.

14 Claims, 9 Drawing Sheets

U.S. PATENT DOCUMENTS

2006/0159189 A1 7/2006 Balakrishnan et al.
2006/0176965 A1* 8/2006 Furman et al. ............... 375/260
2006/0268674 A1* 11/2006 Sudo ........................ 370/208
2008/0212693 A1* 9/2008 Razzell ....................... 375/260
2008/0260044 A1* 10/2008 Yun et al. ............... 375/240.26

OTHER PUBLICATIONS

Written Opinion of the International Searching Authority for International Application No. PCT/US2006/028467, International Application filed Jul. 21, 2006, Inventor: Ravishankar H. Mahadevappa, et al. Written Opinion completed Jan. 5, 2007 and mailed Feb. 20, 2007 (7 pgs.).

English language translation of abstract of TW 200400710 (published Jan. 1, 2004).

English language translation of abstract TW 1221715 (published Oct. 1, 2004).

English language translation of abstract TW 1225335 (published Dec. 11, 2004).

* cited by examiner

OVERLAP-AND-ADD WITH DC-OFFSET CORRECTION

CROSS-REFERENCE TO RELATED APPLICATION(S)

The present application claims priority to Provisional Patent Application No. 60/701,711 filed on Jul. 21, 2005, in the United States Patent and Trademark Office, the entire contents of which are incorporated by reference herein.

BACKGROUND OF THE INVENTION

The present invention relates generally to ultra-wide band (UWB) communication and orthogonal frequency division multiplexed (OFDM) signals in UWB communication, and more particularly to symbol interference correction for received symbols.

Ultrawideband (UWB) communication systems communicate information spread over a large bandwidth, a bandwidth generally shared with other users. Generally, UWB systems may use OFDM signals. An OFDM carrier signal is the sum of a number of orthogonal subcarriers. Baseband data on each subcarrier is independently modulated. Some type of quadrature amplitude modulation (QAM) or phase-shift keying (PSK) may be used as the modulation scheme. The composite baseband signal is typically used to modulate a main RF carrier. OFDM modulation and demodulation may be implemented using digital filter banks generally using a Fast Fourier Transform (FFT) scheme.

OFDM symbol structures and frequency hopping patterns are disclosed in Multiband OFDM Physical Layer Specification, Release 1.0, Jan. 14, 2005 ("MBOA Standard") which is incorporated by reference herein.

The presence of a multipath channel may present difficulties for data communication. In a multipath environment, a transmitted signal may reflect off several objects. As a result, multiple delayed versions of the transmitted signal may arrive at a receiver. The multiple versions of the signal may cause the received signal to be distorted. As a result, each received subcarrier may experience a complex gain, including an amplitude and a phase distortion, due to channel effects. An OFDM symbol transmitted through a multipath wireless channel may encounter both an intersymbol interference and an intrasymbol interference problem. Intersymbol interference is generally the result of interference between successive OFDM symbols. The intrasymbol interference occurs in multicarrier systems, and may be the result of interference amongst the subcarriers of a single OFDM symbol.

A guard interval may be used to address the effects of intersymbol interference as well as to provide transmitters and receivers time to frequency hop in frequency hopping systems. A first, or last, few samples of a symbol are set as a guard interval. The guard interval generally will not contain any useful information and may be discarded at the receiver. The guard interval, however, may not eliminate interference with a symbol.

A cyclic prefix may be included in each symbol to reduce interference effects. A cyclic prefix generally includes a replica of the last samples of a symbol and as such contains redundant information that may be discarded at the receiver. The cyclic prefix generally has the effect of the symbol appearing periodic to a Fast Fourier Transform (FFT) unit, and transforms a convolution of the symbol samples with the channel effects into a multiplication of the two that may be more readily undone in the frequency domain. However, using a cyclic prefix generates a ripple in the power spectral density of the transmitted signal which increases power use. Using a null prefix instead of a cyclic prefix does not generate a ripple in the spectrum, and therefore, using a null prefix may permit an effective higher transmission power for UWB transmissions. The use of a null prefix, however, may result in difficulties in accounting, for example, for multipath interference.

SUMMARY OF THE INVENTION

In one aspect, the invention comprises a method for compensating for excess DC offset in samples of an OFDM symbol at a receiver, the method comprising adding samples received at a first plurality of discrete times to samples received at a second plurality of discrete times; and taking into account the DC offset, wherein a number of the first plurality of discrete times is equal to a number of the second plurality of discrete times, and wherein the samples received at the second plurality of discrete times are null samples.

In another aspect, the invention comprises a method for compensating for excess DC offset in samples of an OFDM symbol before providing the samples for transformation from time domain to frequency domain at a receiver in UWB communication, the OFDM symbol including a first group of samples having a FFT number of samples, followed by a second group of samples having a null number of samples, followed by a third group of samples having a guard number of samples, the null number not exceeding the FFT number, the method comprising selecting an add number of samples from a beginning of the second group immediately following the first group to obtain a null overlap group, the add number not exceeding the null number; obtaining an average DC offset for each sample of the null overlap group; selecting the add number of samples from a beginning of the first group to obtain a Fourier overlap group; overlapping the Fourier overlap group over the null overlap group to obtain pairs of overlapping samples; adding together members of each of the pairs of overlapping samples to obtain samples of an overlapped-and-added group, the overlapped-and-added group immediately following the first group, and each sample of the overlapped-and-added group corresponding to one sample of the null overlap group and having a corresponding average DC offset of the one sample of the null overlap group; subtracting the corresponding average DC offset either from each sample of the null overlap group or from each sample of the overlapped-and-added group; and providing the FFT number of samples beginning after the Fourier overlap group and ending after the overlapped-and-added group for the transformation, wherein the second group forms a null post-fix for the OFDM symbol.

In another aspect, the invention comprises a system for removing distorted samples of an OFDM symbol at a receiver, the system comprising an overlap-and-add part including a DC offset compensation part, wherein the OFDM symbol includes a null post-fix followed by a guard interval, wherein the DC offset compensation part determines a corresponding average DC offset for each sample of an add group of samples from among samples of the null post-fix, wherein the overlap-and-add part subtracts the corresponding average DC offset from each of the samples of the add group, wherein the overlap-and-add part overlaps a first plurality of samples from a beginning of the OFDM symbol over the add group and adds together overlapping samples, a number of samples of the first plurality of samples being equal to a number of samples of the add group, and wherein the overlapand-add part discards the first plurality of samples, the null samples exceeding the add group, and the guard interval as the distorted samples.

In another aspect, the invention comprises a receiver for OFDM symbols transmitted in a UWB communication system, the receiver comprising a receiver antenna for receiving signals including the OFDM symbols; a radio frequency processing unit coupled to the receiver antenna for converting the signals from analog to digital format; a signal processing unit coupled to the radio frequency processing unit for determining a first plurality of samples of the OFDM symbols to be discarded and for maintaining a second plurality of samples to be passed through; and a Fast Fourier Transform unit coupled to the signal processing unit for receiving and transforming the second plurality of samples from time domain to frequency domain, wherein the signal processing unit includes an overlap-and-add unit having DC offset compensation.

These and other aspects of the invention are more fully comprehended on review of this disclosure, including the figures which are part thereof.

DETAILED DESCRIPTION

Figure 1:
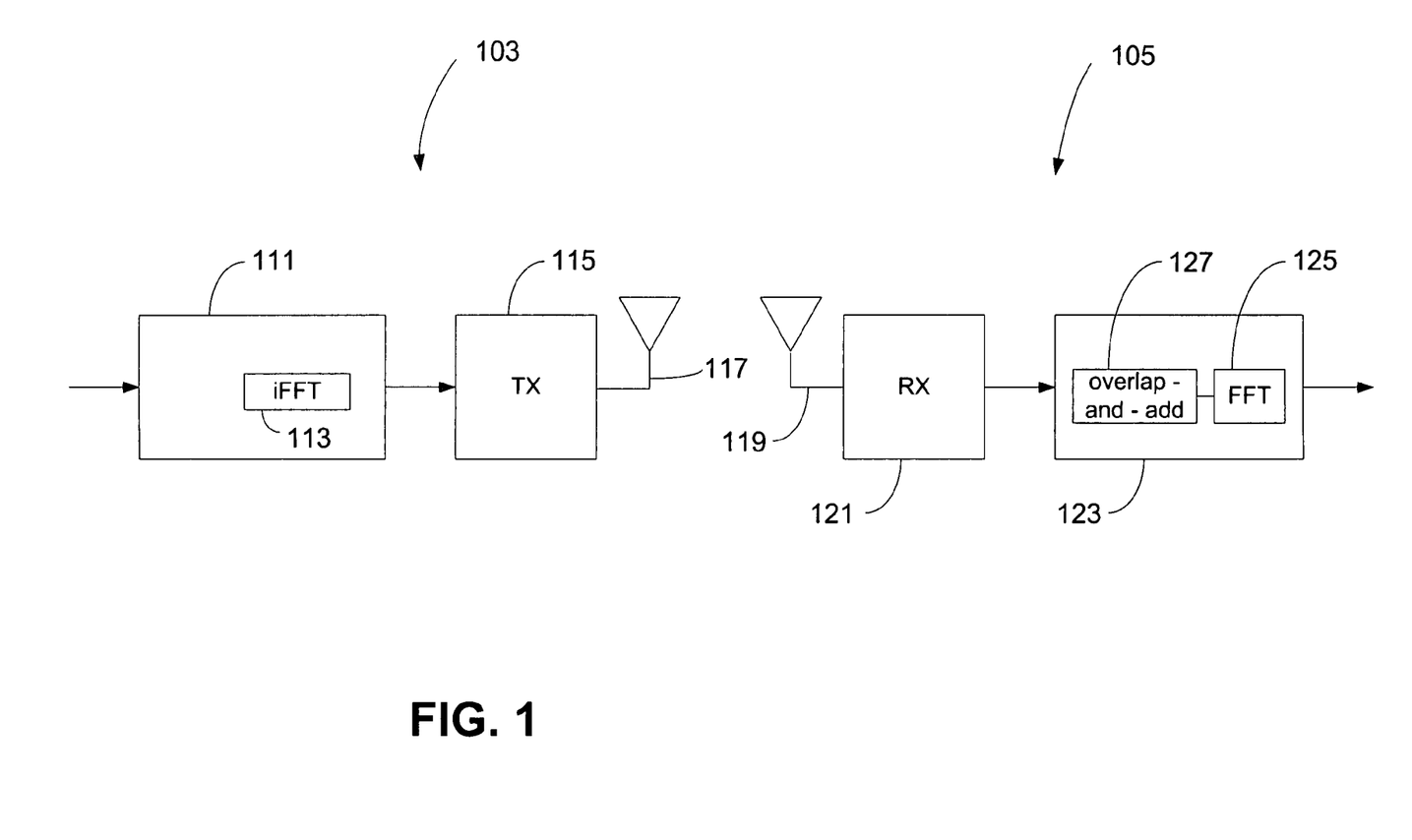
FIG. 1 is a block diagram of the communication system.

FIG. 1 is a block diagram of the communication system in accordance with aspects of the invention. The communication system may be, for example, an ultra-wideband (UWB) communication system using orthogonal frequency division multiplexing (OFDM). In the system of FIG. 1, a transmission system 103 is in data communication with a reception system 105. The transmission system includes a digital processing section 111. The digital processing section receives data from, for example, a MAC, and performs processing on the data. Processing on the data may include channel coding of the data, symbol interleaving, tone interleaving, mapping (or modulating) the data to a particular mapping scheme or constellation and, as illustrated in FIG. 1, performing an inverse Fast Fourier Transform (iFFT) on the data. The data is provided to what may be considered an analog processing section 115. An analog processing section converts the data from the digital processing section to an analog signal (although this may be done as a last step of the digital processing section), upconverts the information, amplifies the information and transmits the information using an antenna 117.

Similarly, the reception system receives the information via an antenna 119, and the received information is operated on by an analog processing section 121. The analog processing section generally amplifies the received signal, downconverts the signal to baseband, and converts the downconverted baseband signal from an analog signal to a digital signal. A digital processing section 123 receives the digital signal and performs functions such as packet detection, frame synchronization, automatic gain control determinations, symbol demapping, Viterbi decoding, and other features. The digital processing section also includes an overlap-and-add block 127 and a Fast Forward Transform (FFT) block 125, performing their associated functions, with these functions generally performed prior to symbol demapping.

The overlap-and-add block operates on received information prior to conversion to the frequency domain by the FFT block. The overlap-and-add block effectively removes a number of samples making up a symbol and adds the removed samples to other samples making up the symbol. The overlap-and-add function is generally primarily to reduce the affects of symbol interference, such as may occur due to multipath reflections. In addition, the overlap-and-add block accounts for extraneous DC offset that might be added to some symbols as a result of the overlap-and-add operation.

Figure 2:
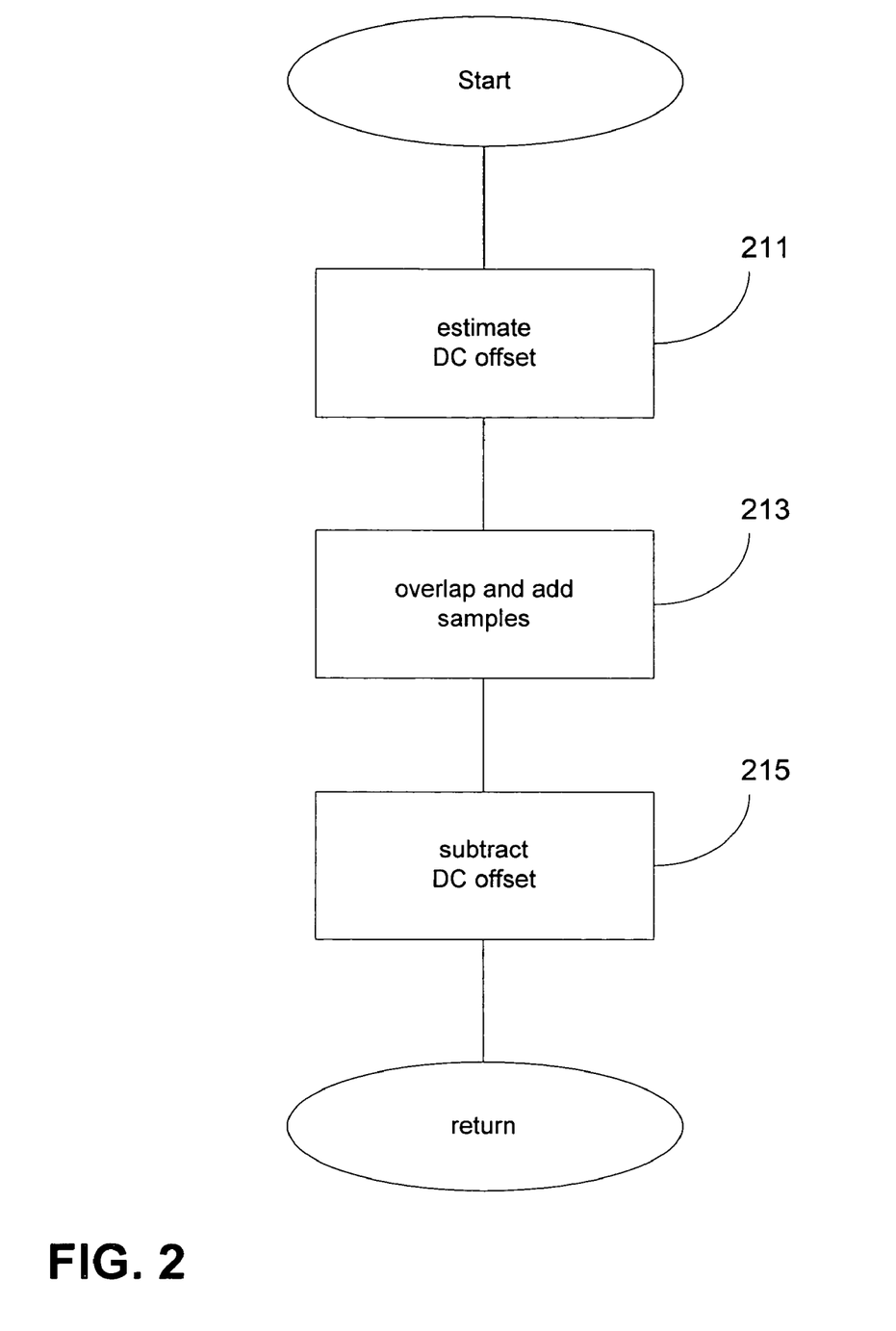
FIG. 2 is a flowchart of a process for performing an overlap-and-add process.

FIG. 2 is a flowchart of a process for performing an overlap-and-add process in accordance with aspects of the invention. In some embodiments, the overlap-and-add process is performed by an overlap-and-add block such as discussed with respect to FIG. 1. In block 211 the process estimates DC offset for a received signal. In some embodiments, this is performed by circuitry associated with automatic gain control processing blocks. In most embodiments, however, the estimation of DC offset is determined by summing a plurality of received samples, or complex magnitudes of received samples, and dividing the summed values by the number of received samples. In practice, it is generally simpler to sum a predetermined number of received samples and divide the sum by the predetermined number. This may be done a single time, with the DC offset thereafter stored for future use, or updated periodically, such as to account for variations in aging and varying temperature. Preferably, however, the estimation of DC offset is performed using a sliding window of received samples such that the DC offset may be considered to be updated effectively for every received sample.

In block 213, the process overlaps and adds samples. In some embodiments, overlapping-and-adding samples comprises adding sample values from a first portion of a symbol to sample values from a second portion of the symbol. In most embodiments, a first $N_{add}$ sample values are added to a second number of $N_{add}$ sample values, with preferably the first $N_{add}$ sample values occurring at the beginning of a symbol and the second $N_{add}$ sample values occurring at the end of an FFT window for the symbol.

The DC offset may be assumed to be constant within a symbol. Therefore, an overlap-and-add process may result in increased effective DC offset for overlapped-and-added samples. Accordingly, in block 215 DC offset is subtracted from the overlapped-and-added sample values. The process thereafter returns.

Figure 3:
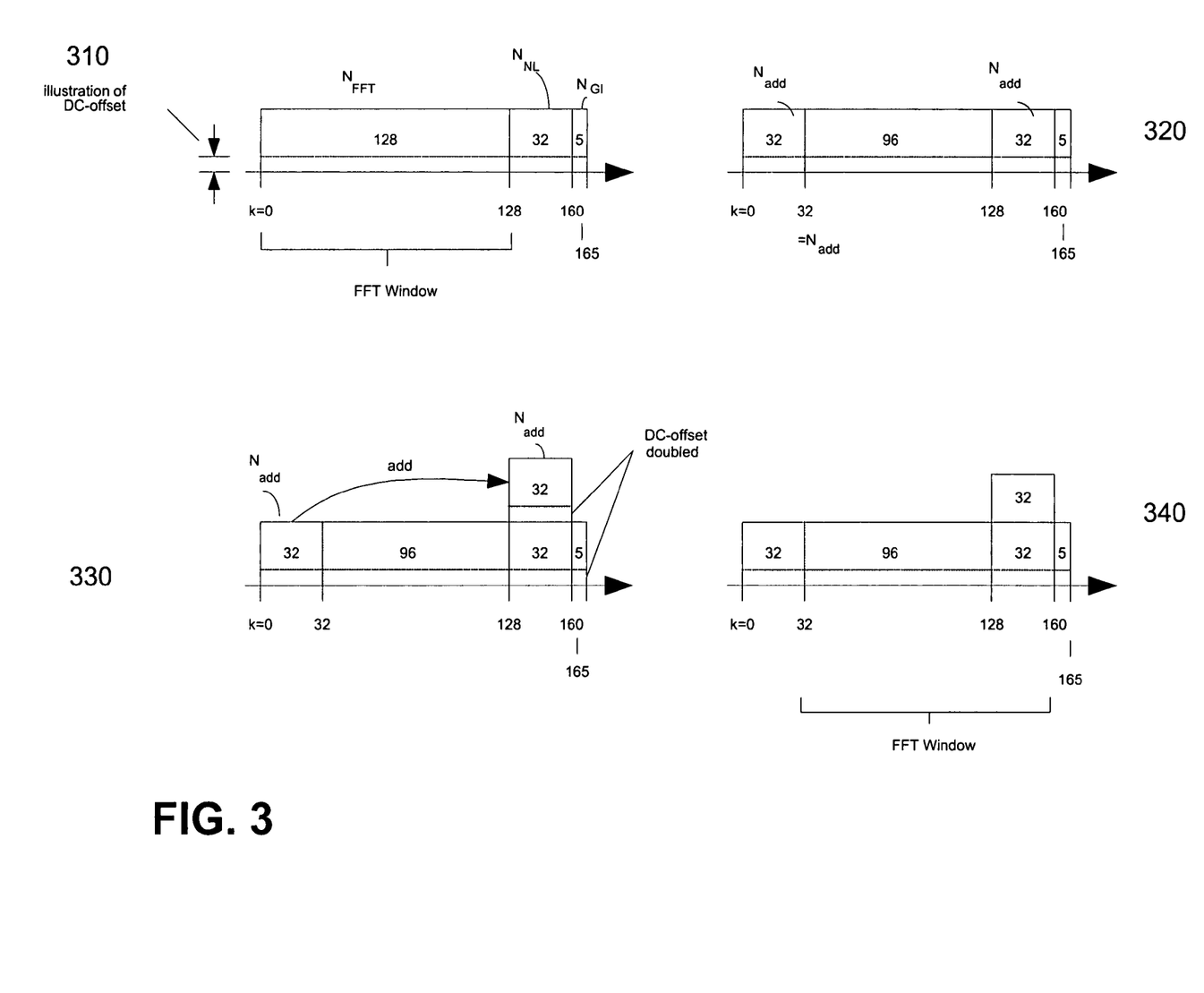
FIG. 3 is an illustration of steps of overlap-and-add for one OFDM symbol with null prefix according to the embodiments of the invention.

FIG. 3 is a pictorial representation of an embodiment of the process of FIG. 2. As illustrated in the example of FIG. 3, a symbol includes 165 samples. In various embodiments, symbols may include other numbers of samples. For simplicity, FIG. 3 does not show the amplitudes of the time domain samples or magnitude or phase of the corresponding complex values of the frequency domain samples included in each OFDM symbol. Of the 165 samples, the first 128 samples provide data, the next 32 samples provide a null prefix (which is implemented as a null postfix), and the remaining 5 samples provide a guard period. FIG. 3 shows the sample format of a received symbol 310, identifies samples $N_{add}$ for use in an overlap-and-add operation 320, shows the results of the overlap-and-add operation 330, and shows the symbol after subtraction of DC offset 340 from the overlapped-and-added samples.

Thus, the first part 310 shows the first OFDM symbol and the allocation of samples within the OFDM symbol. The first OFDM symbol corresponds to samples for the discrete time range of k=0 . . . 164. An FFT window, or the number of samples used for the FFT operation, is $N_{FFT}=128$ samples long. A null interval is 32 samples long such that $N_{NL}=32$ and a guard interval is 5 samples long such that $N_{GI}=5$.

The second part 320 shows an add length $N_{add}$ that is selected from the beginning samples of the OFDM symbol and, as illustrated in FIG. 3, is equal to a null length of the symbol $N_{NL}$ such that $N_{add}=N_{NL}=32$ samples in each symbol. The $N_{add}$ samples from k=0 to k=$N_{add}$−1 are selected which corresponds to k=0 . . . 31 for the exemplary embodiment being described.

The third part 330 shows that the $N_{add}$ samples selected from k=0 to k=$N_{add}$−1 are overlapped-and-added with the last samples of the OFDM symbol before a guard interval group of samples. As such the overlapped-and-added samples cover the samples from k=$N_{FFT}$ to k=$N_{FFT}$+$N_{add}$−1. In the exemplary embodiment shown in FIG. 3, the first 32 samples corresponding to discrete times of k=0 to k=31 from among the first 128 samples are moved to after the FFT window of k=0 to k=127 and overlapped with samples corresponding to k=128 to k=159.

The fourth part 340 shows that a DC offset level is subtracted from the overlapped-and-added samples. The fourth part also identifies samples in the FFT window, which are to be provided to an FFT block for further processing. A total of $N_{FFT}$ samples in the range from k=$N_{add}$ to k=$N_{FFT}$+$N_{add}$−1 are provided by the overlap-and-add stage to the next stage. For example, the results of the overlap-and-add stage are provided to an FFT stage that converts the time domain signal to a frequency domain signal for further processing and decoding. In the exemplary embodiment shown in FIG. 3, a total of 128 samples corresponding to discrete times k=32 to k=128+32−1=159 are output from the overlap-and-add unit to the FFT unit.

A comparison of part 310 and part 340 of FIG. 3 shows that the FFT window moves from samples corresponding to k=0 . . . 127 to samples corresponding to k=32 . . . 159. The noise is removed or reduced in the resulting FFT window of k=32 . . . 159. The other samples are removed before feeding the OFDM symbol to an FFT stage.

In some embodiments, the size of the overlap-and-add window $N_{add}$ is programmable, for example, via registers, external inputs, or processing determinations made by the receiver or an external component. For example, in some embodiments, the size of the overlap-and-add window is determined for a particular receiver, and thereafter remains constant. In other embodiments, the processing section of a receiver varies the overlap-and-add window based on characteristics of received signals or based on a particular frequency of operation.

Figure 4:
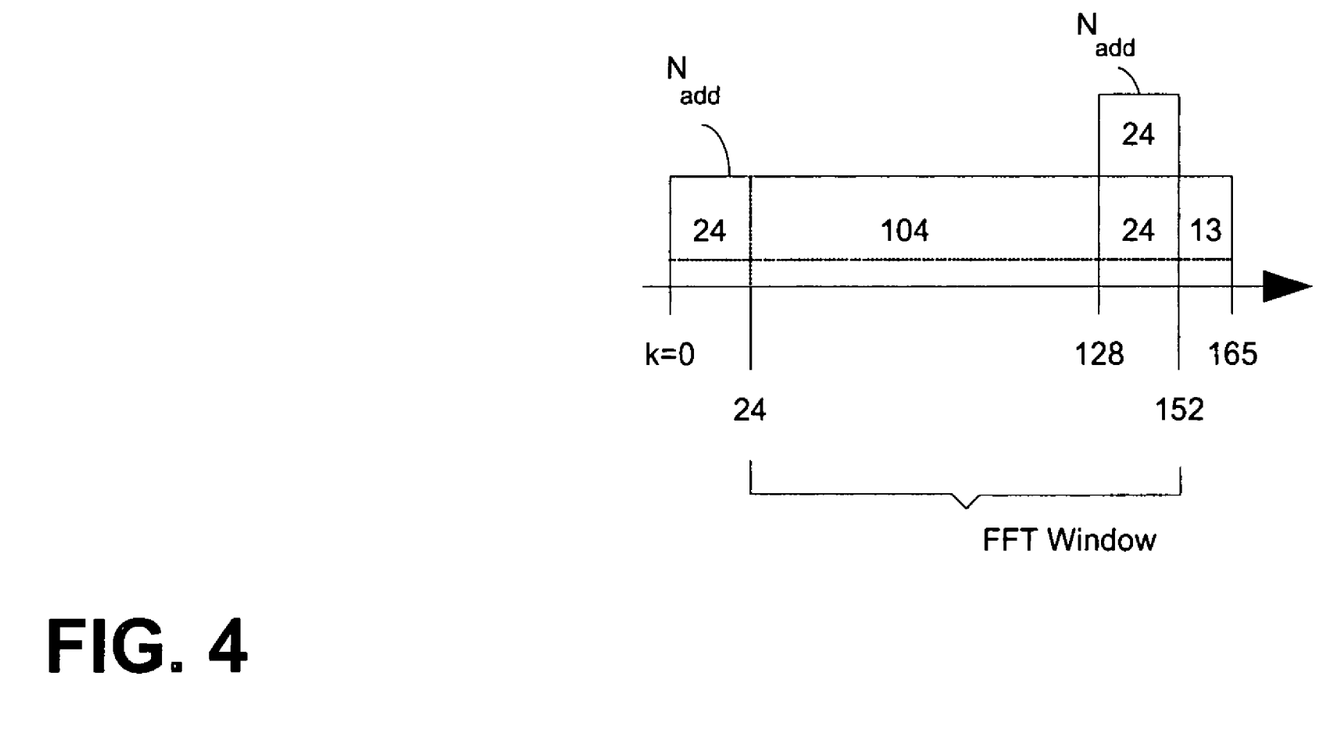
FIG. 4 is an illustration of a further symbol and overlap-and-add window.

FIG. 4 is a pictorial representation of a symbol in which the overlap-and-add window $N_{add}$ is 24 samples. As illustrated in FIG. 4, the symbol includes 165 samples, with the first k=0-23 samples being overlapped-and-added to the samples from the k=128 to k=152. The remaining 13 samples at the end of the symbol are used to buffer transient effects, including transient effects that may occur due to frequency hopping. As described with respect to FIGS. 2 and 3, an estimate of DC offset is removed from the overlap-and-added symbols, thereby minimizing effects of doubling of DC offset due to the overlap-and-adding of samples.

Figure 5:
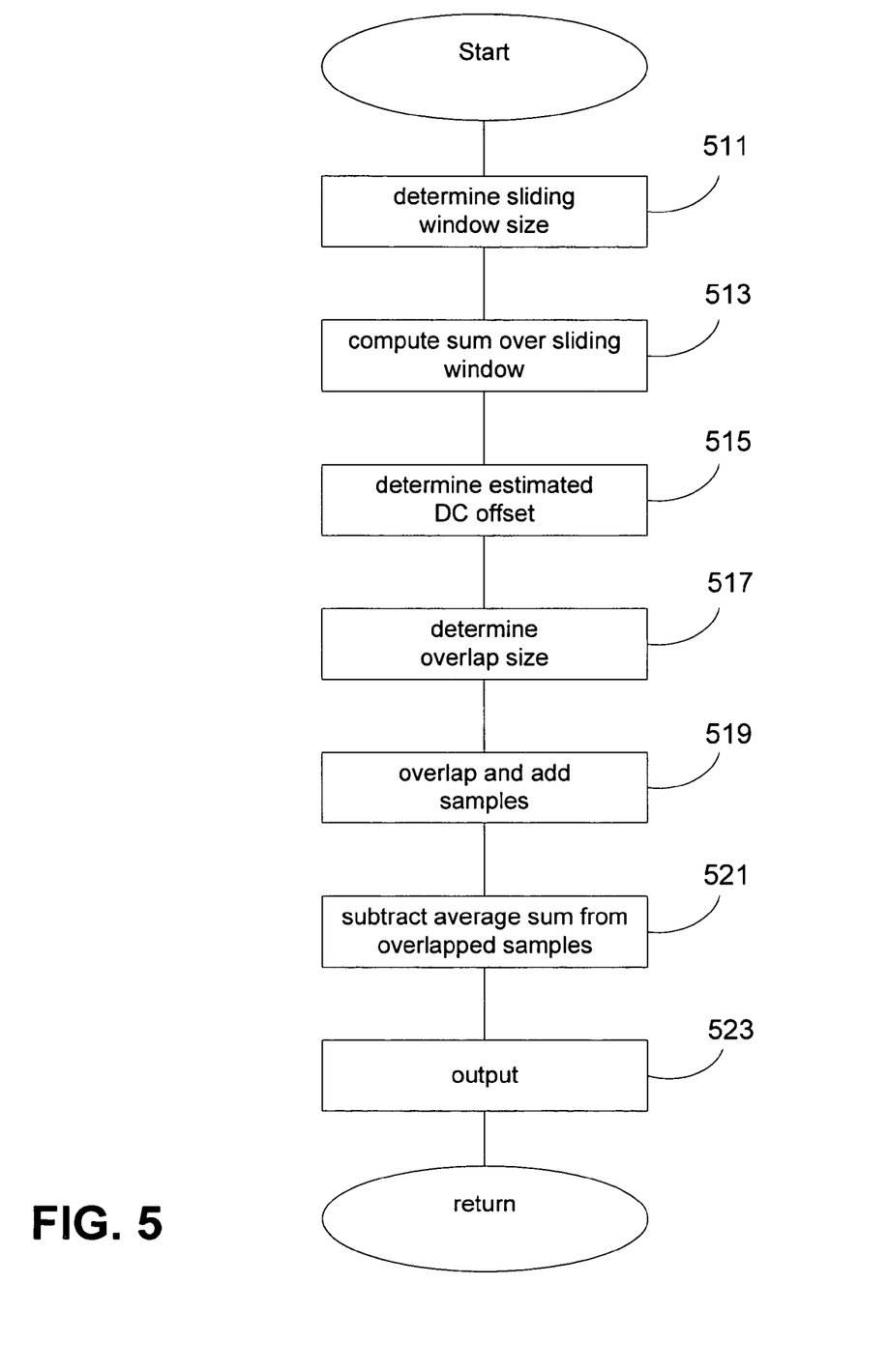
FIG. 5 is a flow diagram of a further process in accordance with aspects of the invention.

FIG. 5 is a flow diagram of a further process in accordance with aspects of the invention. The process of FIG. 5 may be performed, for example, by an overlap-and-add block such as described with respect to FIG. 1. In block 511, the process determines a sliding window size. The sliding window size is used for determination of a DC offset estimate. In some embodiments of the sliding window size is determined based on a format of an expected receive symbol, memory constraints available to a receiver, or other factors.

In block 513, a DC offset sum is computed over the sliding window. For example, in some embodiments, a DC offset sum m(k) at discrete time k is estimated. In some embodiments, the estimate of the DC offset sum m(k) is obtained by summing up values of samples arriving before the discrete times k over a window of size $N_{FFT}$ such that m(k)=Σs(k−1−i) where i=0, . . . , $N_{FFT}$−1. The notation s(k) indicates the sample value at discrete time k. Then, m(k)=s(k−1)+s(k−2)+ . . . +s(k−$N_{FFT}$+1)+s(k−$N_{FFT}$). For example, for $N_{FFT}=128$ and k=160, the DC offset sum is calculated as m(160)=s(159)+s(158)+ . . . +s(33)+s(32).

In other embodiments, the computation of m(k) is implemented by a sliding window over the discrete time period k. The window may be of the size $N_{FFT}$. For example, for computing m(k), the previous result m(k−1) is used and the new sample s(k) of the new window is added to the previously calculated DC offset m(k−1) while the old sample s(k−$N_{FFT}$) that is no longer within the new window is subtracted. Accordingly, m(k)=m(k−1)+s(k)−s(k−$N_{FFT}$). Effectively, the window for estimating the DC offset has moved from k−1−$N_{FFT}$ . . . k−2 to k−$N_{FFT}$ . . . k−1.

For example, for $N_{FFT}=128$, k−1=160, and k=161, the DC offset sum using a moving window is calculated as $m(160)=s(159)+s(158)+\ldots+s(33)+s(32)$ and $m(161)=m(160)+s(160)−s(32)=s(160)+s(159)+s(158)+\ldots+s(34)+s(33)$.

In block 515, the process divides the DC offset sum m(k) by the number of the samples in the window used to obtain m(k) to find the estimates DC offset for each sample. So, the DC offset sum is divided as m(k)/$N_{FFT}$ if the DC offset is obtained over the FFT window, spanning from 0 to $N_{FFT}$−1, and the number of samples used to obtain m(k) is $N_{FFT}$.

As shown in FIG. 5, this occurs after the computation of the sum in block 513, but in various embodiments this may occur concurrent with or before the computation of the sum in block 513. Also, in some embodiments, the estimate of the DC offset, including computation of the DC offset sum, is not performed continuously. For example, in some embodiments, the process does not re-perform the operations of blocks 513 and 515 more than once per powerup cycle, or only performs these operations on an irregular basis, while performing the operations of, for example, blocks 519-523 on a regular basis.

In block 519 of FIG. 5, the first $N_{add}$ samples corresponding to k=0 . . . $N_{add}$−1, are overlapped-and-added to the $N_{add}$ samples after the FFT window and before the guard interval at k=$N_{FFT}$ . . . $N_{FFT}$+$N_{add}$−1.

In block 521, the process subtracts the average sum, or the mean value, of the samples in some embodiments from the overlapped-and-added samples. Again the processing of block 519, although illustrated as being performed after the processing of block 517, may occur before or concurrent with the processing of block 517. Accordingly, the sample value s'(k) for each discrete time k, between $N_{FFT}$ and $N_{FFT}$+$N_{add}$−

1, after overlap-and-add related operations, is s'(k)=s(k)+s(kN$_{FFt}$)– m(k)/N$_{FFT}$ where s(k) denotes sample values prior to the overlap-and-add operation and s'(k) denotes updated sample values after the overlap-and-add operation. For example, for N$_{add}$=32 and N$_{FFT}$=128, the updated sample value s'(k) at discrete time k, when k varies between 128 and 159, is s'(k)=s(k)+s(k−128)−m(k)/128. If k=159, then the new sample value s'(159) after overlap-and-add is defined as s(159)+s(31)−m(159)/128.

Figure 6:
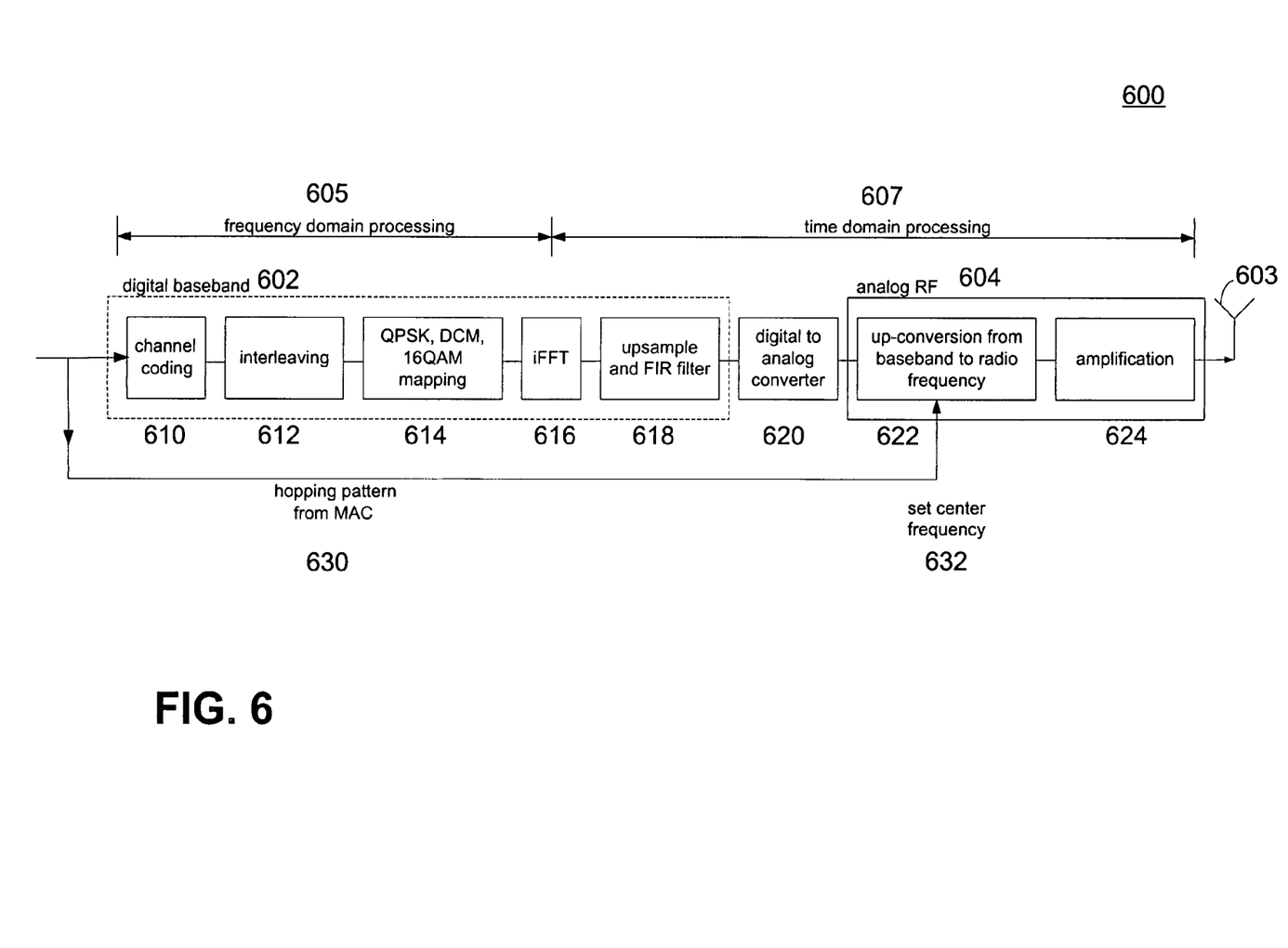
FIG. 6 is a block diagram of an OFDM transmitter.

After the average or, mean in some embodiments, value of the estimated DC offset has been removed from the sample values that have been overlapped with and added to the null values toward the end of an OFDM symbol, the samples are output to the FFT unit, to convert the time domain signal to a frequency domain signal for further processing and decoding. For a FFT window of size N$_{FFT}$, a total of N$_{FFT}$ samples corresponding to discrete times k=N$_{add}$· . . N$_{FFT}$+N$_{add}$−1 are output from the overlap-and-add stage to the FFT stage. For example, in part 340 of FIG. 3, samples corresponding to k=32 to k=128+32−1=159 are output to the following FFT unit. In FIG. 6, samples corresponding to k=24 to k=128+24−1=151 are output to the FFT unit.

The k values, ranging from k=0 to k=165, that are used to describe the exemplary embodiments above, correspond to a single OFDM symbol. Processing for additional OFDM symbols is performed in the same manner or a similar manner.

Also, as previously discussed, the size of the overlap-and-add window N$_{add}$ may be flexible in some embodiments. For example, in some embodiments the overlap-and-add window is adjusted externally to match with a particular analog RF behavior. For example, for N$_{NL}$=32, N$_{GI}$=5, and N$_{add}$=0, no overlap-and-add is performed and N$_{NL}$+N$_{GI}$=32+5=37 samples are skipped for buffering transient effects during frequency hopping. For N$_{NL}$=32, N$_{GI}$=5, and N$_{add}$=24, an overlap of the first 24 samples over the 24 samples of the 32 null samples and adding of these samples is performed such that the remaining N$_{NL}$−N$_{add}$+N$_{GI}$=32−24+5=13 samples at the end of the OFDM symbol are skipped.

Figure 7:
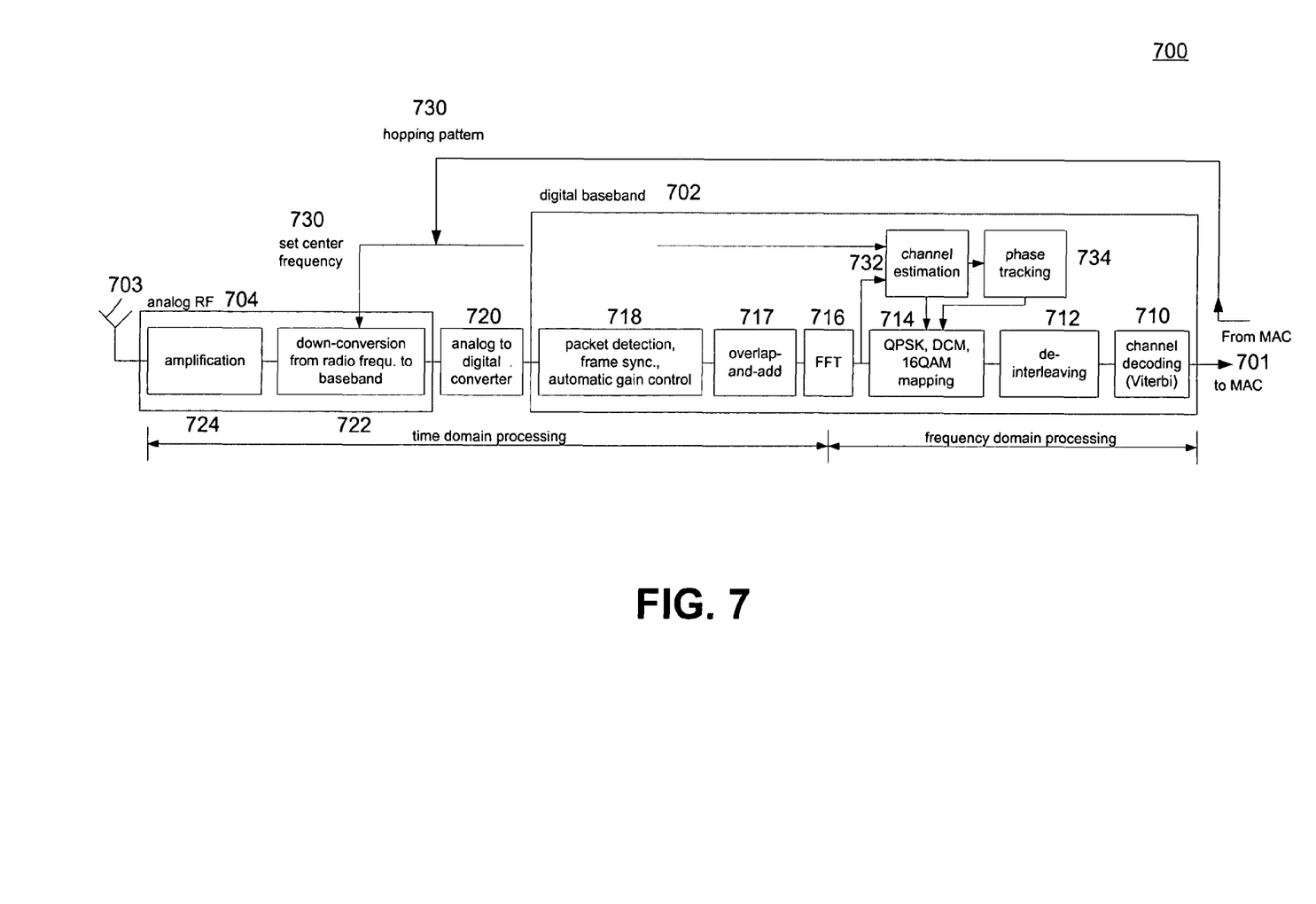
FIG. 7 is a block diagram of an OFDM receiver.

In some embodiments, the invention is part of or used in a system such as shown in FIGS. 6 and 7. FIG. 6 is a block diagram of an orthogonal frequency division multiplexed (OFDM) transmitter 600 with digital baseband 602 and analog RF 604 processing stages. At the transmitter 600, channel encoding is performed by a channel encoder 610 that encodes a bit stream of data from a medium access controller (MAC) (not shown) coupled to the transmitter 600. Depending on the rate of data in the bit stream one or more encoders may be used. The encoders may use a convolutional code. The encoded bit stream is interleaved using a symbol and a tone interleaver 612, and mapped (sometimes referred to as modulated) 614 into symbols, using for example, a quadrature phase shift keying (QPSK) a dual carrier modulation (DCM) constellation, a QAM constellation, or a variety of other constellations. A DCM constellation corresponds to two shifted QPSK constellations and effectively implements a 16QAM constellation with a rate ½ repetition code over two subcarriers. Further repetition coding, such as conjugate symmetric spreading or frequency spreading, may also be applied. After mapping, the subcarriers in the signal are grouped into OFDM symbols, with each OFDM symbol including, for example, 128 subcarriers. The signal is then transformed from frequency to time domain using, for example, a 12S-point inverse Fast Fourier Transform (iFFT) by an iFFT block 616. After finite impulse response filtering by an FIR block 618, the baseband signal is converted by a digital-to-analog converter 620 from the digital domain to the analog domain.

Data processing at the transmitter 600 may therefore be considered divided into processing in the frequency domain 605 and processing in the time domain 607 with the iFFT block 616, separating frequency domain processing and time domain processing.

The analog signal is upconverted from baseband to passband by an upconverter 622 (generally using one or more mixers), amplified by an amplifier 624, and radiated over a transmit antenna 603. A frequency hopping pattern is decided according to a time-frequency code (TFC) number provided by the transmitter MAC. A center frequency is also decided by the transmitter MAC.

FIG. 7 is a block diagram of an OFDM receiver 700 with digital baseband 702 and analog RF 704 processing stages. A signal received at a receiver antenna 703 is amplified by an amplifier 724, and downconverted by a downconverter (generally using one or more mixers) 722 from passband to baseband. A received signal strength indication (RSSI) signal is provided to the baseband for automatic gain control purposes. During downconversion, frequency hopping according to a TFC number provided by a MAC 703 of the receiver 700 may be performed.

After downconversion from radio frequency to baseband 722, the baseband signal is converted from analog to digital using an analog-to-digital converter 720. The digital baseband processing 702 may include blocks for signal processing such as packet detection, frame synchronization, and automatic gain control 718 An overlap-and-add unit 717 removes the null prefix of the OFDM symbols in the time domain. An FFT block 716 transforms the signal from the time domain to the frequency domain. Thereafter, processing enters the frequency domain processing 705 stage from the time domain processing 707 stage with a channel estimation block 732. Phase estimation or tracking block 734, uses a demapping block 714, a deinterleaving block (generally implemented as a tone deinterleaver and a symbol deinterleaver.

Figure 8:
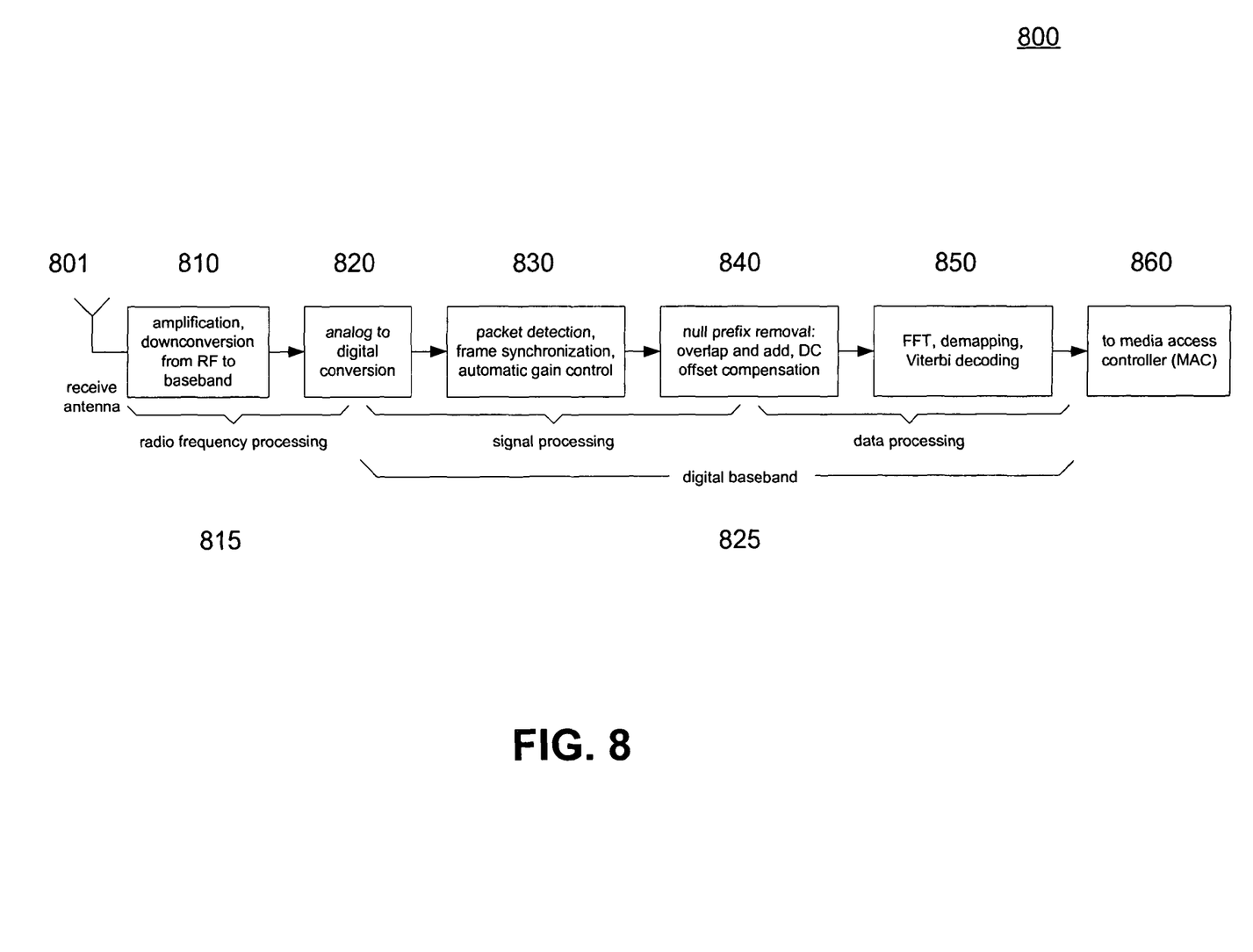
FIG. 8 is a block diagram of a receiver of an OFDM UWB communication system illustrating position of null prefix removal within the chain of processing according to the embodiments of the invention.

FIG. 8 is a block diagram of a receiver of an OFDM UWB communication system including aspects of the invention, and processing therein, including null prefix removal according to the embodiments of the invention.

A signal including OFDM symbols is received at a receiver antenna 801. The signal is first subject to RF processing 815 and then subject to digital baseband processing 825 after an analog to digital conversion stage 820.

The RF processing 815 includes a stage 810 that may include amplification and downconversion from RF to baseband, followed by a stage 820 that includes analog to digital conversion. The digital baseband processing 825 includes signal processing 835 and data processing 845 stages before providing processed data to a receiver media access controller 860.

The signal processing stage 835 covers the path of the received signal from after conversion to digital form, through a stage 830 that may include packet detection, frame synchronization, and automatic gain control, and a stage 840 that derives the data from the signal. The stage 840 may include null prefix removal, overlap-and-add, and DC offset compensation. The encoded data derived from the signal received at the receiver antenna 801, is further processed during a stage 850 that may include a Fast Fourier Transform (FFT) for taking the data from the time domain to the frequency domain, demapping or demodulation in the frequency domain, and Viterbi decoding of the encoded data.

The N$_{NL}$+N$_{GI}$ zero samples per OFDM symbol are generally removed at the receiver 800, by picking only N$_{FFT}$ samples to be fed to the FFT stage 850, for further processing in the digital baseband. The selection of the respective $N_{FFT}$ samples per OFDM symbol is done in the null prefix removal and the overlap-and-add stage 840. If an OFDM symbol received has a nonzero DC level, corresponding to a nonzero component at frequency zero, then overlap-and-add accumulates two sets of DC levels in the symbol range being overlapped-and-added. Accordingly, the excess DC amount should be compensated for proper overlap-and-add operations.

Figure 9:
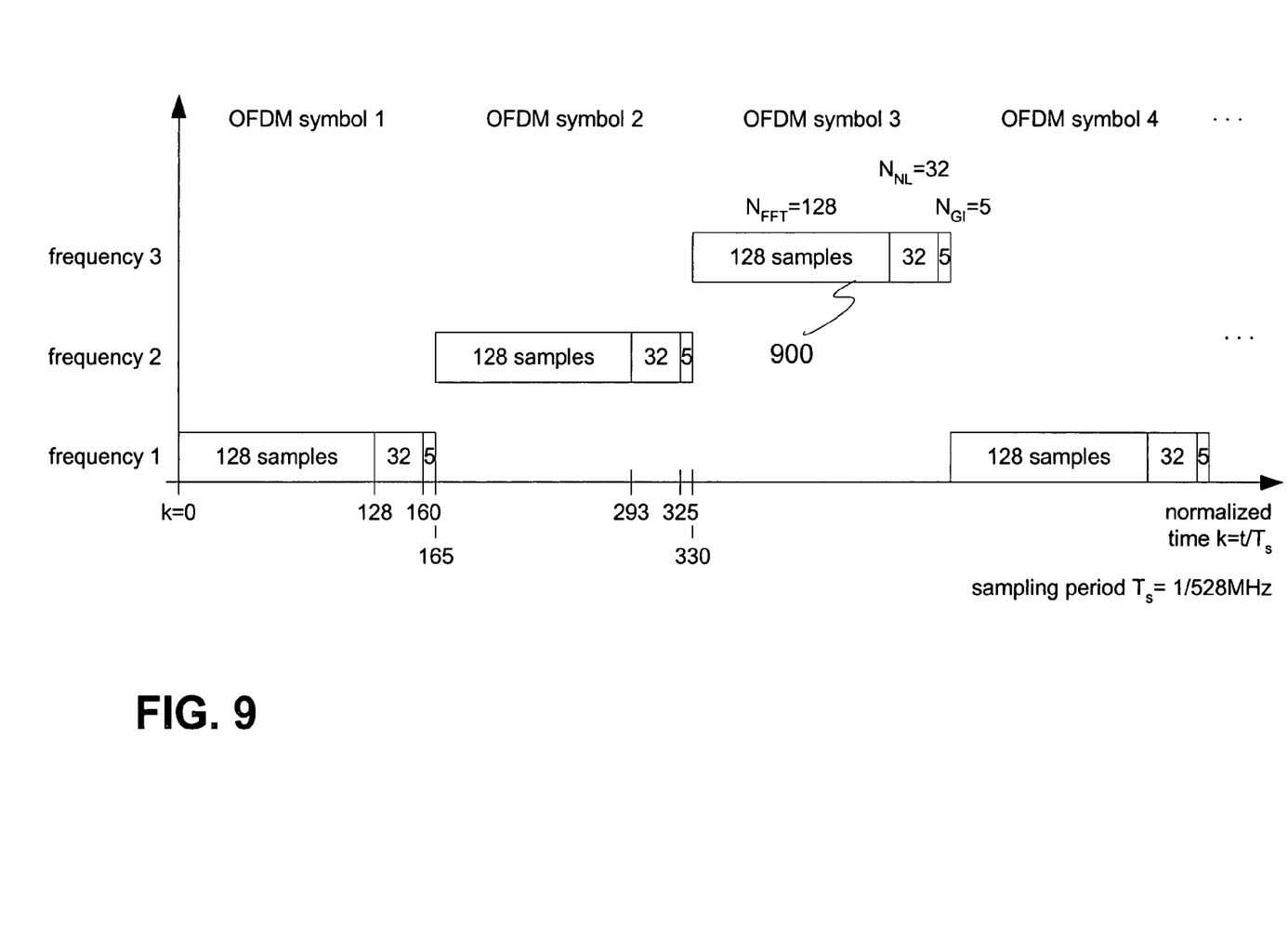
FIG. 9 is a diagram showing an OFDM symbol structure and an exemplary frequency hopping pattern.

In some embodiments, the invention is part of or used in frequency hopping communication systems. FIG. 9 is a diagram of an example of frequently hopping using symbols having an OFDM symbol structure 900, including a null prefix ($N_{NL}$) and a guard interval ($N_{GI}$). The OFDM symbols shown in FIG. 9 are each 165 samples long. Then, the first OFDM symbol begins at k=0 and t=0s. The second OFDM symbol begins at k=165 corresponding to t=k*Ts=165*(1/528)=0.3s. At the receiver, generally, packet detection and frame synchronization 830 provide a timing reference, to identify the start of the OFDM symbols to be detected by packet detection. For example, in FIG. 9, the start of the OFDM symbols are at discrete time indices k =165*n, where n=0, 1, 2, 3 . . . is an integer.

The drawing also shows a frequency hopping pattern for the OFDM symbols versus a discrete time k=t/Ts where Ts is defined as the sampling period and is equal to the inverse of the transmission frequency bandwidth or sampling frequency of each OFDM symbol such that Ts=1/f.

In the digital baseband stage, an OFDM symbol may include 165 samples at a sampling frequency of 528 MHz= 1/Ts. With the exemplary sampling frequency of 528 MHz and a corresponding sampling period Ts of 1/528s, that are shown, the time t corresponding to the discrete time k=165 is, for example, equal to t=k*Ts=165/528=0.3s. The 165 samples within the first OFDM symbol, in the exemplary embodiment shown, arrives at the receiver over a period of 0.3 seconds.

All OFDM symbols may be transmitted on a same frequency or, as shown in FIG. 9, each OFDM symbol may be transmitted on a different frequency according to a time-frequency code pattern (TFC) as shown in FIG. 9. The center frequency of the transmitted OFDM symbol is changed for every OFDM symbol according to a TFC pattern of the OFDM transmission. This is sometimes referred to as time-frequency hopping.

Of the 165 samples shown, a number equal to $N_{FFT}$=128 samples are usable and forms the FFT window size with the remaining samples comprising null prefix (postfix) or guard period samples, for example. Null samples having a number $N_{NL}$=32 samples are set to zero at the transmitter. A null prefix having $N_{NL}$=32 samples is shown as a postfix here, but referred to as prefix. The null prefix may be a prefix or a postfix. A number of $N_{GI}$=5 samples form the guard interval or guard time and are set to zero at the transmitter to buffer any transient effects during frequency hopping. The number of samples in the FFT window $N_{FFT}$, the null interval $N_{NL}$, or the guard interval $N_{GI}$ may be varied in different embodiments.

The frequency hopping occurs at the end of the OFDM symbol. For example, in FIG. 9 the frequency hops at discrete time k=160 during the guard interval NGI that includes 5 samples. The transient effects, resulting from switching of RF frequency at hops, are supposed to happen during the guard interval. Therefore, the $N_{GI}$ samples of the guard interval are invalid and skipped, such that they are not further used in the digital baseband processing.

Accordingly, in some embodiments, a receiver receives OFDM symbols, adds information indicative of samples received for a first plurality of time periods to samples for a second plurality of time periods, and takes into account DC offset. In some embodiments, taking account of DC offset comprises subtracting DC offset from the samples for the second of plurality of time periods, and in some embodiments comprises subtracting DC offset from information indicative of samples derived from the first plurality of time periods. In some embodiments DC offset is determined by summing samples derived over a plurality of time periods, and in some embodiments the samples are in complex form and in some embodiments the DC offset is determined as a mean of the samples. In some embodiments, the plurality of time periods comprise a sliding window of time periods.

Although the present invention has been described with reference to certain exemplary embodiments, it is understood that a variety of modifications and variations may be made to the present invention without departing from the spirit or scope of the invention defined in the appended claims, and their equivalents.

What is claimed is:

1. A method for compensating for excess DC offset in samples of an orthogonal frequency division multiplexed (OFDM) symbol before providing the samples for transformation from time domain to frequency domain at a receiver in a communication system, the OFDM symbol including a first group of samples having a FFT number of samples, followed by a second group of samples having a null number of samples, followed by a third group of samples having a guard number of samples, the null number not exceeding the FFT number, the method comprising:

selecting an add number of samples received by the receiver from a beginning of the second group immediately following the first group to obtain a null overlap group, the add number not exceeding the null number;

obtaining an average DC offset for each sample of the null overlap group;

selecting the add number of samples from a beginning of the first group to obtain a Fourier overlap group;

overlapping the Fourier overlap group over the null overlap group to obtain pairs of overlapping samples;

adding together members of each of the pairs of overlapping samples to obtain samples of an overlapped-and-added group, the overlapped-and-added group immediately following the first group, and each sample of the overlapped-and-added group corresponding to one sample of the null overlap group and having a corresponding average DC offset of the one sample of the null overlap group;

subtracting the corresponding average DC offset either from each sample of the null overlap group or from each sample of the overlapped-and-added group; and providing the FFT number of samples beginning after the Fourier overlap group and ending after the overlapped-and-added group for the transformation, wherein the second group forms a null post-fix for the OFDM symbol.

2. The method of claim 1, wherein the add number is a constant number.

3. The method of claim 1, wherein the add number is a variable.

4. The method of claim 1, wherein the obtaining of the average DC offset for each sample of the null overlap group includes:

obtaining one overall DC offset for each sample of the null overlap group as a sum of the FFT number of preceding samples; and dividing the overall DC offset for each sample of the null overlap group by the FFT number.

5. The method of claim 1, wherein the obtaining of the average DC offset for each sample of the null overlap group includes:
   obtaining a first overall DC offset for a first sample of the null overlap group as a sum of the FFT number of the samples preceding the first sample;
   obtaining each succeeding overall DC offset for a current sample of the null overlap group as a preceding overall DC offset added to the current sample minus a sample preceding the current sample by the FFT number of samples; and
   dividing the overall DC offset for each sample of the null overlap group by the FFT number.

6. A system for removing distorted samples of an orthogonal frequency division multiplexed (OFDM) symbol at a receiver, the system comprising an overlap-and-add part including a DC offset compensation part,
   wherein the OFDM symbol includes a null post-fix followed by a guard interval,
   wherein the DC offset compensation part determines a corresponding average DC offset for each sample of an add group of samples from among samples of the null post-fix,
   wherein the overlap-and-add part subtracts the corresponding average DC offset from each of the samples of the add group, wherein the overlap-and-add part overlaps a first plurality of samples from a beginning of the OFDM symbol over the add group and adds together overlapping samples, a number of samples of the first plurality of samples being equal to a number of samples of the add group, and
   wherein the overlap-and-add part discards the first plurality of samples, the null samples exceeding the add group, and the guard interval as the distorted samples.

7. The system of claim 6, wherein the DC offset compensation part determines the corresponding average DC offset for each sample of the add group by summing together an FFT number of samples preceding each sample of the add group and dividing an obtained sum by the FFT number.

8. The system of claim 6, wherein the DC offset compensation part determines the corresponding average DC offset for each sample of the add group by:
   obtaining a first overall DC offset by summing together an FFT number of samples preceding a first sample of the add group,
   obtaining succeeding overall DC offsets by sliding a window having the FFT number of samples forward from the first sample, each overall DC offset obtained as a sum of samples within the corresponding window, and
   obtaining the corresponding average DC offset for each sample by dividing each overall DC offset by the FFT number.

9. The system of claim 6, wherein the number of samples in the first plurality of samples is variable.

10. The system of claim 6, wherein the number of samples in the first plurality of samples is predetermined.

11. A receiver for orthogonal frequency division multiplexed (0FDM) symbols transmitted in a communication system, the receiver comprising:
   a receiver antenna for receiving signals including the OFDM symbols;
   a radio frequency processing unit coupled to the receiver antenna for converting the signals from analog to digital format;
   a signal processing unit coupled to the radio frequency processing unit for determining a first plurality of samples of the OFDM symbols to be discarded and for maintaining a second plurality of samples to be passed through; and
   a Fast Fourier Transform unit coupled to the signal processing unit for receiving and transforming the second plurality of samples from time domain to frequency domain,
   wherein the signal processing unit includes an overlap-and-add unit having DC offset compensation,
   wherein the OFDM symbols include a null post-fix,
   wherein the overlap-and-add unit determines an average DC offset corresponding to each of a third plurality of samples in the null post-fix, and
   wherein the overlap-and-add unit subtracts the average DC offset from each corresponding sample within the null post-fix.

12. The receiver of claim 11, wherein the OFDM symbols include a null prefix or a null post-fix.

13. The receiver of claim 11,
   wherein the overlap-and-add unit determines the average DC offset corresponding to each current sample of the third plurality of samples within the null post-fix by summing a FFT number of samples preceding the current sample and dividing an obtained sum by the FFT number, and
   wherein the FFT number is equal to a number of samples of the second plurality of samples.

14. The receiver of claim 11,
   wherein the second plurality of samples begin after an add number of samples of each of the OFDM symbols,
   wherein the add number is equal to a number of samples in the third plurality of samples, and
   wherein the add number is variable corresponding to switching characteristics of the radio frequency processing unit.

* * * * *